R. TOEPLITZ.
JOURNAL BOX LUBRICANT DEVICE.
APPLICATION FILED JUNE 30, 1915.
1,164,890.
Patented Dec. 21, 1915.
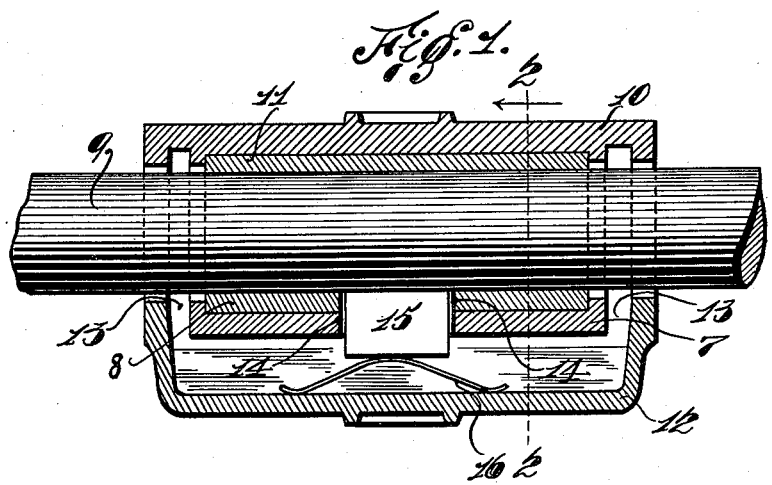
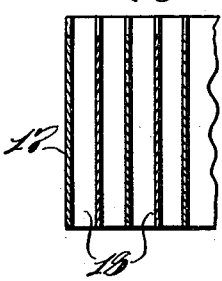
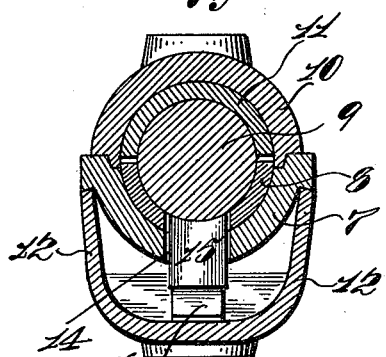
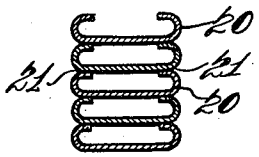
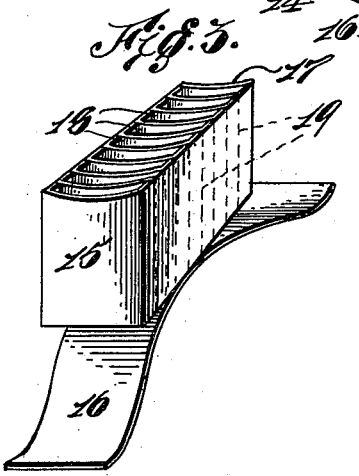
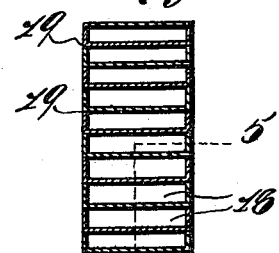
Inventor
Richard Toeplitz
Philip B. Rich
attorney.

UNITED STATES PATENT OFFICE.

RICHARD TOEPLITZ, OF ELIZABETH, NEW JERSEY, ASSIGNOR TO THE A. & F. BROWN COMPANY, OF ELIZABETH, NEW JERSEY, A CORPORATION OF NEW JERSEY.

JOURNAL-BOX LUBRICANT DEVICE.

1,164,890.      Specification of Letters Patent.      Patented Dec. 21, 1915.

Application filed June 30, 1915. Serial No. 37,147.

*To all whom it may concern:*

Be it known that I, RICHARD TOEPLITZ, a citizen of the United States, and a resident of Elizabeth, in the county of Union and State of New Jersey, have invented certain new and useful Improvements in Journal-Box Lubricant Devices, of which the following is a specification.

My invention relates to that class of lubricant devices for journals in which the journal-box is provided in its bottom with an oil chamber from which the oil or other lubricating liquid is carried upward to the journal.

The objects of my invention, among other things, are to simplify and improve the construction of the lubricating block so as to increase the power of resistance in the block and to prevent any dirt or foreign material in the oil chamber from passing up to the journal, and further to enable the oil or lubricant to be fed to the journal so that the bearing is continuously supplied with sufficient oil during the revolutions of the journal.

In the accompanying drawings, Figure 1 is a longitudinal sectional elevation of a journal-box showing my improvement. Fig. 2 is a cross sectional view taken on the line 2—2 of Fig. 1 looking in the direction of the arrow. Fig. 3 is an enlarged perspective view of my improved lubricating block. Fig. 4 is a horizontal cross sectional view of the block shown in Fig. 3. Fig. 5 is an enlarged vertical sectional view taken on the line 5—5 of Fig. 4. Fig. 6 is an enlarged detail cross sectional view of a modified form of construction for the lubricating block.

Similar numerals refer to similar parts throughout the several figures.

In the drawings 7 represents the journal-box having a bearing plate 8 supporting the journal 9. The journal-box 7 is provided with a cap 10 having the upper bearing plate 11. Below the journal-box 7, is a suitably formed oil chamber 12 into which oil or other lubricating liquid may be poured through suitable openings 13, located at the ends of the journal-box 7, as shown in Fig. 1.

The journal-box 7 with the bearing plate 8 have a suitable opening, or slot, 14 formed therein, as shown in Fig. 1, through which my improved lubricating block 15 projects to contact with the journal 9. The block 15 is preferably mounted on a curved spring 16, the ends of which rest on the bottom of the chamber 12, as shown in Fig. 1, thereby causing the block 15 to bear closely against the journal 9. However, the block 15 may itself rest on the bottom of the chamber 12 with the top surface in contact, or nearly so, with the journal 9.

Referring more particularly to Figs. 3 to 6 inclusive, the lubricating block 15 is preferably composed of a plurality of thin sheet metal sections 17, having their ends bent up at right angles, as shown in Fig. 4. These sections 17 are assembled in vertical alinement, as shown, thereby forming narrow vertical channels 18, contiguous to each other and extending from the bottom to the top of the block 15. In practice I have found that these channels 18 are preferably not wider than fifteen-one thousandths of an inch, though I do not wish to limit myself to the size of these vertical passages which permit the oil or other lubricating fluid to pass upward through these channels to the journal 9. The top surface of this block is preferably concave, as shown in Fig. 2, so that its entire top surface bears closely against the journal 9, though this is not essential. The outer edges of the sections 17 are soldered or welded along their sides, as shown in Figs. 3 and 4, so that my improved block 15 is closed in on all four sides, having only the top and bottom surfaces open.

In Fig. 6, the lubricating block 15 is shown as composed of a series of sheet metal sections 20, both ends being bent U-shaped, and they are then assembled in vertical position and soldered or welded together along the side edges at 21 as shown in this figure.

With the lubricating block 15 in place in the journal-box 7 projecting through the opening 14, and having its top surface in contact with the journal 9, the oil or other lubricating fluid is lifted from the oil chamber 12 through the channels 18, partly through capillary attraction and partly through the revolution of the journal itself, so as to supply sufficient lubrication for the journal when in operation in either direction; and this block continues to carry oil upwardly so long as the bottom of the block is immersed in oil. Furthermore, my improved block is so constructed as to drain the clean oil below the surface in the oil chamber.

It is obvious that with this form of construction as herein before described, the block 15 has greater strength, stability and durability than others now in use for this purpose, and that the narrowness of the vertical channels 18 effectively prevents larger pieces of steel, emery, or other foreign matter, that generally accumulate on the top surface of the oil in chamber 12, from rising to the top surface of the block 15 and cause injury to the bearing itself.

I realize that considerable variation may be made in the details of construction heretofore shown and described and I do not wish to be understood as limiting my invention to the specific forms herein illustrated.

Having now described my invention, what I claim as new and desire to secure by Letters Patent is the following, viz:

1. A lubricating block composed of a plurality of flat sheet-metal sections lying so closely together as to form a series of narrow, transverse, capillary channels extending from top to bottom, and closed on all four sides.

2. A lubricating block having a series of narrow, transverse, capillary channels not to exceed fifteen one-thousandths of an inch in width, extending from top to bottom, and closed on all four sides.

3. The combination with a journal-box having an oil-chamber below same, of a lubricating block composed of a plurality of flat sheet-metal sections lying so closely together as to form a series of narrow, transverse, capillary channels extending from top to bottom, and closed on all four sides.

4. The combination with a journal-box having an oil-chamber below same, of a lubricating block having a series of narrow, transverse, capillary channels not to exceed fifteen one-thousandths of an inch in width, extending from top to bottom, and closed on all four sides.

5. The combination with a journal-box having an oil-chamber below same, of a spring-supported lubricating block composed of a plurality of flat sheet-metal sections lying so closely together as to form a series of narrow, transverse, capillary channels extending from top to bottom, and closed on all four sides.

6. The combination with a journal-box having an oil-chamber below same, of a spring-supported lubricating block having a series of narrow, transverse, capillary channels not to exceed fifteen one-thousandths of an inch in width, extending from top to bottom, and closed on all four sides.

7. The combination with a journal-box having an oil-chamber below same, of a lubricating block composed of a plurality of flat sheet-metal sections lying so closely together as to form a series of narrow, transverse, capillary channels extending from top to bottom, and closed on all four sides, the bottom extending below the oil surface.

8. The combination with a journal-box having an oil-chamber below same, of a lubricating block having a series of narrow, transverse, capillary channels not to exceed fifteen one-thousandths of an inch in width, extending from top to bottom, and closed on all four sides, the bottom extending below the oil surface.

9. The combination with a journal-box having an oil-chamber below same, of a spring-supported lubricating block composed of a plurality of flat sheet-metal sections lying so closely together as to form a series of narrow, transverse, capillary channels extending from top to bottom, and closed on all four sides, the bottom extending below the oil surface.

10. The combination with a journal-box having an oil-chamber below same, of a spring-supported lubricating block having a series of narrow, transverse, capillary channels not to exceed fifteen one-thousandths of an inch in width, extending from top to bottom, and closed on all four sides, the bottom extending below the oil surface.

11. The combination with a journal-box having an opening therein, of an oil-chamber below said journal-box, and a lubricating block composed of a plurality of flat sheet-metal sections lying so closely together as to form a series of narrow, transverse, capillary channels extending from top to bottom, said block projecting through said opening and having its bottom below the oil surface.

12. The combination with a journal-box having an opening therein, of an oil-chamber below said journal-box, and a lubricating block composed of a plurality of flat sheet-metal sections lying so closely together as to form a series of narrow, transverse, capillary channels extending from top to bottom, and resilient means to yieldingly support said block in said opening, the bottom of said block extending below the oil surface.

13. The combination with a journal-box having an opening therein, of an oil-chamber below said journal-box, and a lubricating block composed of a plurality of flat sheet-metal sections lying so closely together as to form a series of narrow, transverse, capillary channels not to exceed fifteen one-thousandths of an inch in width, extending from top to bottom, said block projecting through said opening and having its bottom below the oil surface.

14. The combination with a journal-box having an opening therein, of an oil-chamber below said journal-box, and a lubricating block composed of a plurality of flat sheet-metal sections lying so closely together as to form a series of narrow, transverse, capillary channels not to exceed fifteen one-thousandths of an inch in width, extending from top to bottom, and resilient means to yieldingly support said block in said opening, the bottom of said block extending below the oil surface.

RICHARD TOEPLITZ.

Witnesses:
 CHARLES BROWN,
 JOHN R. SAUERBRUNN.